United States Patent
Bergerioux et al.

(10) Patent No.: US 9,676,342 B2
(45) Date of Patent: Jun. 13, 2017

(54) VEHICLE TRIM ELEMENT AND AN ASSOCIATED DISPLAY SYSTEM

(71) Applicant: Faurecia Interieur Industrie, Nanterre (FR)

(72) Inventors: Jacques Bergerioux, Arronville (FR); Didier Ponthieu, St. Pierre (FR)

(73) Assignee: Faurecia Interieur Industrie, Nanterre (FR)

(*) Notice: Subject to any disclaimer, the term of this patent is extended or adjusted under 35 U.S.C. 154(b) by 0 days.

(21) Appl. No.: 14/745,404

(22) Filed: Jun. 20, 2015

(65) Prior Publication Data
US 2015/0367784 A1 Dec. 24, 2015

(30) Foreign Application Priority Data
Jun. 23, 2014 (FR) .................................. 14 55797

(51) Int. Cl.
*B60R 7/00* (2006.01)
*B60R 7/04* (2006.01)
*B60N 3/00* (2006.01)
*B60R 7/06* (2006.01)

(52) U.S. Cl.
CPC .............. *B60R 7/04* (2013.01); *B60N 3/002* (2013.01); *B60R 7/06* (2013.01)

(58) Field of Classification Search
CPC .............. B60R 7/04; B60R 7/05; B60N 3/002
See application file for complete search history.

(56) References Cited

U.S. PATENT DOCUMENTS

2013/0154297 A1* 6/2013 Doll .................... B60R 7/04
296/37.8
2014/0110962 A1 4/2014 Bohnenberger

FOREIGN PATENT DOCUMENTS

| CN | 101531162 A | 9/2009 |
|---|---|---|
| DE | 4327869 C1 | 8/1994 |
| EP | 1197384 A1 | 4/2002 |
| EP | 2722231 A1 | 4/2014 |
| FR | 2990665 A1 | 11/2013 |
| JP | 10000974 A | 1/1998 |
| JP | 2000335314 A | 12/2000 |

OTHER PUBLICATIONS

French Search Report for corresponding application No. 1455797, dated Feb. 11, 2015, 2 pages.

* cited by examiner

*Primary Examiner* — Lori L Lyjak
(74) *Attorney, Agent, or Firm* — Reising Ethington P.C.

(57) ABSTRACT

An assembly having a cover, adapted for closing an aperture of a storage volume, and a flap moveable between a storage position and a use position outside the storage volume. The assembly includes a connection between the cover and the flap. Movement of the flap causes a displacement of the cover towards a position in which the aperture is open.

10 Claims, 2 Drawing Sheets

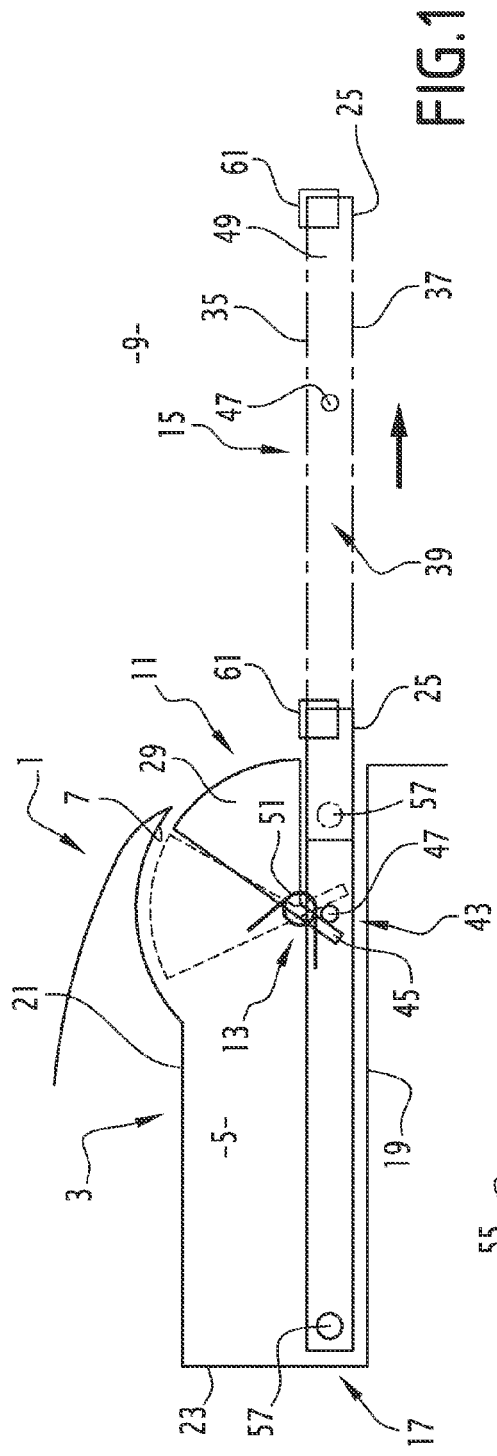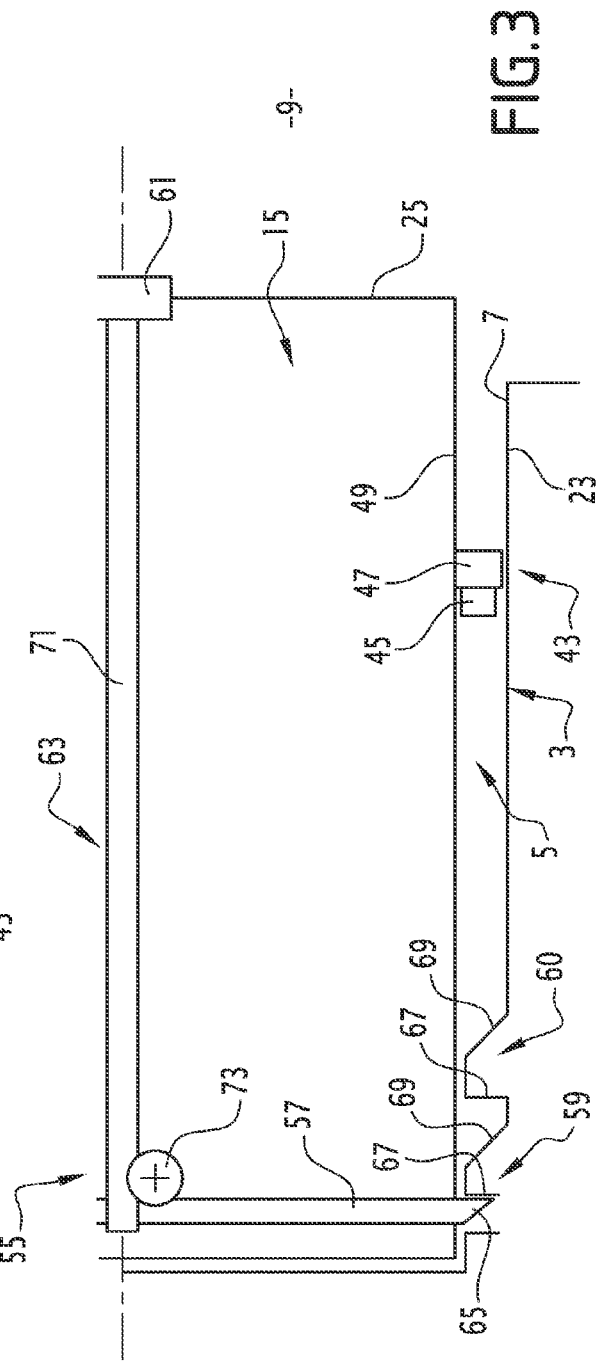

VEHICLE TRIM ELEMENT AND AN ASSOCIATED DISPLAY SYSTEM

TECHNICAL FIELD

The present invention generally relates to the interior arrangement of vehicles, in particular when they are equipped with support flaps.

More specifically, the invention relates to an interior assembly of a vehicle, the assembly being of the type comprising:
- a structure delimiting a storage volume and an aperture by which the storage volume communicates with a passenger compartment of the vehicle;
- a cover;
- a connection between the cover and the structure, arranged so that the cover is movable relative to the structure between a position closing off the aperture and a position in which the aperture is open;
- a flap;
- a connection between the flap and the structure, arranged so that the flap is movable relative to the structure between a storage position, in which the flap extends at least partially inside the storage volume, and a deployed position, in which at least part of the flap is situated outside the storage volume.

BACKGROUND

EP-2,411,239 describes such an interior assembly. In order to deploy the flap, it is first necessary to place the cover in its open position, then to grasp the flap and pull it so that it deploys in a telescoping manner.

Such a procedure thus requires several separate operations, and may be relatively difficult to implement when the user only has one available hand.

SUMMARY

In this context, the invention aims to propose an interior assembly of a vehicle that is more user-friendly.

To that end, the invention pertains to an interior assembly of the aforementioned type, the assembly including a connection between the cover and the flap, a movement of the flap causing a movement of the cover from its closing position toward its open position.

The assembly may also have one or more of the features below, considered individually or according to any technical possible combination(s):
- the movement of the flap from its storage position toward its deployed position causes the movement of the cover from its closing position toward its open position;
- the flap moves from its storage position to its deployed position over a first travel, the cover moving from its closing position toward its open position along a second travel, the movement of the flap toward its deployed position to an intermediate position situated at less than 20% of the first travel causing a movement of the cover from its closing position toward its open position over at least 80% of the second travel;
- the connection between the flap and the structure is sliding;
- the connection between the cover and the flap comprises at least one cam member connected to the cover, and at least one cam follower connected to the flap;
- the connection between the cover and the flap comprises at least one elastic member interposed between the cover and the structure and returning the cover to the open position;
- the cam member and the cam follower are arranged so that cam member pushes the cam follower under the effect of the return force of the elastic member, at least when the flap is in the storage position, in a direction propelling the flap toward its deployed position and the cam follower pushes the cam member against the return force of the elastic member, when the flap is moved to its storage position;
- the assembly comprises a locking device reversibly locking the flap relative to the structure in the storage position;
- the locking device is able to reversibly lock the flap relative to the structure in the intermediate position;
- the locking device comprises a bolt connected to the flap and cooperating with at least one raised portion of the structure to lock the flap, a control member accessible to passengers of the vehicle, and a kinematic chain arranged so that actuation of the control member by the passengers causes the disengagement of the bolt with respect to the raised portion and the release of the flap.

BRIEF DESCRIPTION OF THE DRAWINGS

Other features and advantages of the invention will emerge from the detailed description thereof provided below, for information and non-limitingly, in reference to the appended figures, in which:

FIG. 1 is a diagrammatic side illustration of an interior assembly according to the invention;

FIG. 3 is a partial top view of the assembly of FIG. 1.

DETAILED DESCRIPTION OF THE ILLUSTRATED EMBODIMENTS

Figure 2:
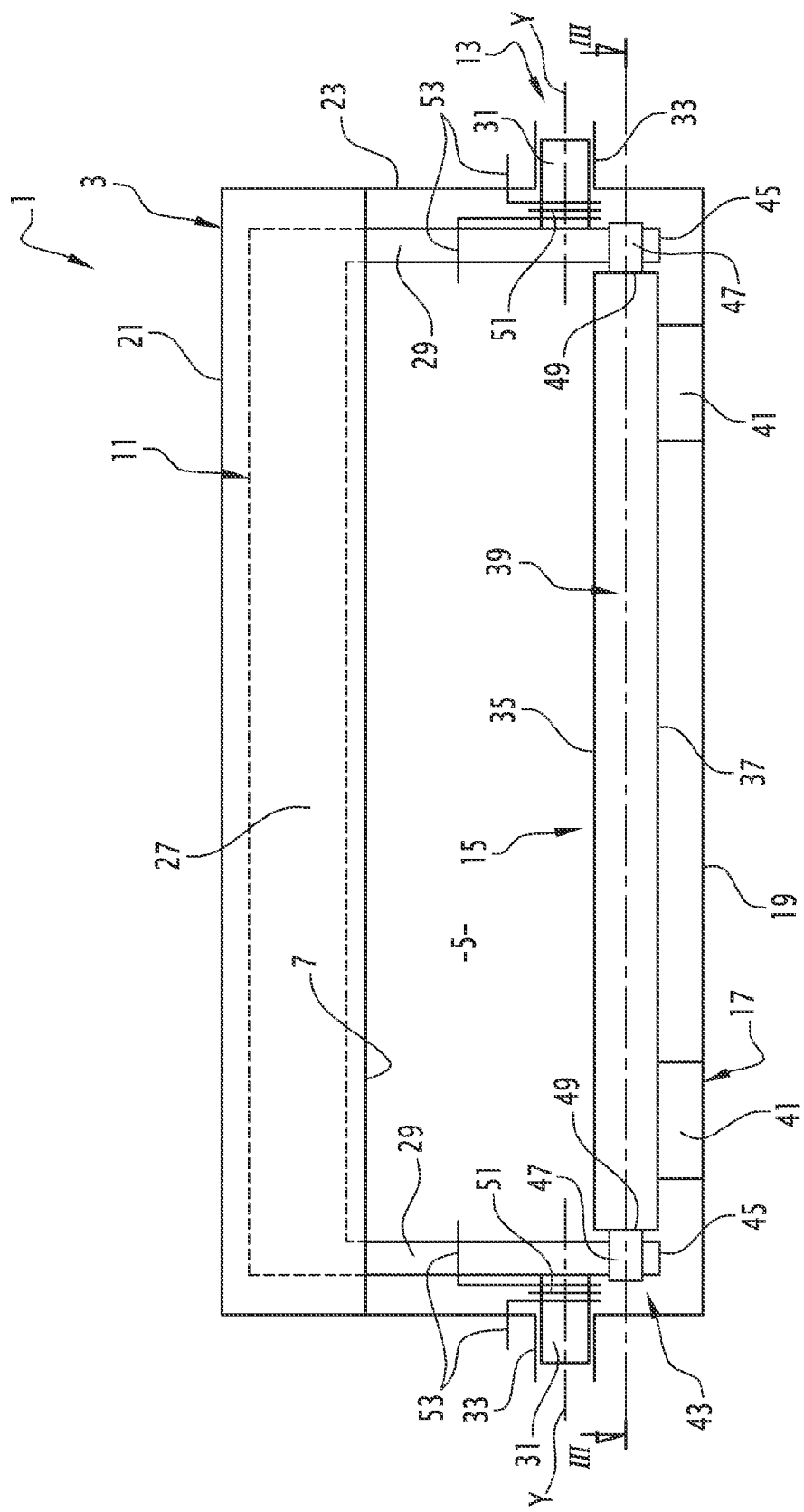
FIG. 2 is a diagrammatic front illustration of the assembly of FIG. 1.

The assembly 1 diagrammatically shown in FIG. 1 is designed to be installed inside a vehicle, i.e., in the passenger compartment. In the illustrated example, the assembly 1 is a dashboard. Alternatively, the assembly corresponds to another piece of interior equipment of the vehicle, for example the trim of a side door, the center console of the vehicle, etc.

The vehicle is typically a motor vehicle, for example a car or truck.

The longitudinal and transverse, right and left, front and rear directions are understood here relative to the normal direction of movement of the vehicle.

As shown in FIG. 1, the assembly 1 comprises:
- a structure 3 delimiting a storage volume 5 and an aperture 7 by which the storage volume 5 communicates with a passenger compartment 9 of the vehicle;
- a cover 11;
- a connection 13 between the cover 11 and the structure 3;
- a flap 15;
- a connection 17 between the flap 15 and the structure 3.

For example, the structure 3 is a dashboard cover.

The volume 5 is intended for the storage of various objects onboard the vehicle.

In the illustrated example, the storage volume 5 is delimited by a bottom 19 facing downward, an upper wall 21 facing upward, and a side wall 23 connecting the bottom and the upper wall to one another. The aperture 7 faces the rear of the vehicle. Alternatively, the aperture 7 faces another direction.

The connection 13 is arranged so that the cover 11 is movable between a position closing the aperture 7, shown in solid lines in FIG. 1, and a position in which the aperture 7 is open, shown in broken lines in FIG. 1.

In the illustrated example, the connection is a pivot link. The pivot has a horizontal and transverse axis. The horizontal here corresponds to an orientation parallel to the rolling plane of the vehicle.

In the illustrated example, the cover goes from its closing position to its opening position by tilting upward toward the front of the vehicle, around the axis of the pivot.

The flap 15 is provided to allow passengers to set down a laptop computer, or to eat, read, write, etc.

It is thin, in light of its dimensions in a horizontal plane.

In a horizontal plane, it for example has a width comprised between 20 and 40 cm, and a depth comprised between 15 and 30 cm.

The connection 17 between the flap 15 and the structure is arranged so that the flap is movable relative to the structure 3 between a storage position, in which the flap extends at least partially inside the storage volume 5, shown in solid lines in FIG. 1, and a deployed position in which at least part of the flap is situated outside the storage volume 5, shown in broken lines in FIG. 1.

In the illustrated example, in the storage position, a rear edge 25 of the flap protrudes outside the storage volume 5, through the aperture 7. In that case, the cover in its closing position closes off all the rest of the aperture, i.e., the entire surface of the aperture that is not occupied by the flap.

Alternatively, the rear edge 25 in the storage position arrives exactly in the aperture, and according to another alternative, the flap in the storage position is completely housed inside the storage volume. In the latter alternative, in the closing position, the cover completely closes off the aperture 7.

In the deployed position, the flap protrudes outside the storage volume 5 through the aperture 7.

Typically, both in the storage position and the deployed position, the flap is situated on the horizontal.

Preferably, the connection 17 of the flap to the structure is a sliding connection. In the illustrated example, the flap goes from its storage position to its deployed position through a translational movement toward the rear of the vehicle, in the longitudinal direction. Alternatively, the movement of the flap from its storage position to its deployed position comprises a rotation in addition to a translation.

As shown in FIG. 2, the cover 11 includes a central panel 27 with a suitable shape for closing off the aperture 7, and two flanges 29, secured to two opposite transverse ends of the panel 27.

The pivot link 13 includes two axis ends 31 secured to the flanges 29, and two orifices 33 arranged in the side wall 23. The axis ends 31 are aligned transversely and define the axis of rotation Y. They are freely rotating in the orifices 33.

Furthermore, the flap 15 is upwardly and downwardly delimited by two large faces 35, 37, respectively, and circumferentially by a section 39.

The connection 17 includes two slideways 41, oriented longitudinally, connecting the bottom 19 of the storage volume to the lower large face 37 of the flap. Alternatively, the slideways are interposed between the section 39 of the flap and the side wall 23 of the storage volume.

The assembly 1 further includes a connection 43 between the cover 11 and the flap 15, arranged such that a movement of the flap 15 causes a movement of the cover 11 from its closing position toward its open position.

More specifically, it is the movement of the flap 15 from its storage position toward its deployed position that causes movement of the cover from its closing position to its open position.

To that end, the connection 43 between the cover and the flap comprises at least one cam member 45 connected to the cover and at least one cam follower 47 connected to the flap.

In the illustrated example, the connection 43 includes two cam members 45 and two cam followers 47. The two cam members 45 are connected to the two flanges 29 of the cover. The two cam followers 47 are connected to the section 39 of the flap. More specifically, the section 39 has two opposite transverse edges 49, delimiting the flap toward the right and left of the vehicle. The cam followers 47 are connected to the two transverse edges 49.

In the example shown in the figures, the cam members 45 are arms protruding toward the bottom 19 of the volume from the flanges 29. The cam followers 47 are lugs, protruding transversely relative to the transverse edges 49.

The connection 43 between the cover and the flap also comprises at least one elastic member 51, interposed between the cover 11 and the structure 3, and returning the cover 11 to its open position. In the illustrated example, the connection 43 includes two elastic members 51, each elastic member 51 connecting a flange 29 to the structure 3.

In the illustrated example, the elastic members 51 are torsion springs, wound around the axis ends 31.

Alternatively, the elastic members 51 are not torsion springs, but could be hair springs, leaf springs, or any other type of elastic members.

Each elastic member 51 here includes two end strands 53, one of the strands 53 bearing against the side wall 23 and the other strand 53 bearing against one of the flanges 29.

The assembly 1 also includes a locking device 55, reversibly locking the flap 15 relative to the structure 3 in the storage position. This device is more particularly shown in FIG. 3. Preferably, and as shown in FIG. 3, the locking device 55 is also suitable for reversibly locking the flap 15 relative to the structure 3 in an intermediate position. This intermediate position is chosen as outlined below.

Typically, the locking device 55 comprises a moving bolt 57 connected to the flap, one or more raised portions 59, 60 connected to the structure 3 and cooperating with the bolt 57 to lock the flap in the storage position and/or the intermediate position, a control member 61 accessible to passengers of the vehicle, and a kinematic chain 63 arranged so that actuation of the control member by the passengers causes the disengagement of the bolt 57 with respect to the raised portion(s) 59, 60.

The bolt 57 is typically transversely movable. It is returned to the locking position shown in FIG. 3 by an elastic member (not shown). In the locking position, a pointed end 65 of the bolt protrudes relative to the edges 49 of the flap. The pointed end 65 is delimited toward the rear by a side oriented substantially transversely, and toward the front by an oblique side.

The raised portions 59, 60 are for example arranged in the material of the side wall 23 of the storage volume. In the illustrated example, the locking device 55 includes two protruding raised portions 59, 60. The raised portion 59 makes it possible to lock the drawer in the storage position, and the raised portion 60 makes it possible to lock the drawer in the intermediate position. Alternatively, the device 55 only includes one raised portion 59, provided to lock the flap in the storage position.

The raised portions 59, 60 illustrated in the example are teeth, delimited toward the front of the vehicle by a planar face 67 oriented substantially transversely, and toward the rear of the vehicle by an oblique face 69.

Typically, the control member 61 is a pivoting paddle. It is mounted on the drawer 15.

For example, the kinematic chain 63 comprises a longitudinal rod 71, able to be translated longitudinally relative to the drawer 15 under the effect of the movement of the control member 61. The rod 63 in turn rotates a gear wheel 73, which in turn rotates the bolt 57 by means of a rack-type connection.

As shown in FIG. 3, in the locking position of the bolt 57, the end 65 bears, by its transverse side, on the planar face 67 of one of the raised portions 59, 60.

The operation of the assembly 1 will now be described.

An initial situation is considered in which the drawer 15 is in the storage position, and the cover 11 is in the closing position. The bolt 57 is in the locking position.

This situation is shown in FIG. 3. The end 65 of the bolt bears by means of its transverse side on the planar face 67 of the raised portion 59.

In this situation, the elastic member(s) 53 bias the cover 11 toward its open position.

As shown in FIG. 1, each cam member 45 then bears on the corresponding cam follower 47.

The cam members 45 and the cam followers 47 are arranged so that the cam member 45 pushes on the cam follower 47 under the effect of the return force of the elastic member 53, in a direction propelling the flap toward its deployed position.

However, the movement of the flap is prevented by the bolt 57 cooperating with the raised portion 59, which locks the flap in the storage position.

When a passenger actuates the control member 61, the bolt 57 disengages with respect to the raised portion 59, which locks it. This leads to the release of the flap from its storage position.

More specifically, in the illustrated example, the passenger actuates the paddle 61, which results in moving the rods 71 longitudinally toward the front of the vehicle. The bolt 57 is driven transversely by the gear wheel 73, which in turn is driven by the rod 71. The bolt is moved to a retracted position, in which the bolt protrudes transversely little or not at all relative to the transverse edge 49 of the drawer. In this position, the end 65 of the bolt no longer cooperates with the raised portion 59 to lock the flap in position.

Under the effect of the return force of the elastic member(s) 53, the cover 11 moves from its closed position to its open position of the aperture 7. In the illustrated example, this movement corresponds to pivoting of the cover 11 upward and toward the front of the vehicle.

Each cam member 45 then pushes the corresponding cam follower 47 and propels the flap toward the deployed position. The flap 15, which is free relative to the structure 3, moves.

Below, the first travel refers to the travel of the flap 15 from its storage position to its deployed position, and the second travel refers to the travel of the cover 11 from its closed position to its open position.

The connection 43 between the cover and the flap is arranged such that the movement of the flap 15 from its storage position to the aforementioned intermediate position causes a movement of the cover 11 from its closed position to its open position over at least 80% of the second travel. Furthermore, the intermediate position is situated at less than 20% of the first travel.

Thus, a short movement of the flap 15 toward its deployed position is sufficient to open nearly all of the aperture 17.

For example, the intermediate position is situated between 10 and 20% of the first travel, for example between 15 and 20% of the first travel. Typically, when the flap 15 reaches its intermediate position, the cover 11 has traveled over more than 90% of the second travel, and still more preferably 100% of the second travel.

Once the flap 15 has reached its intermediate position, it is locked in that position by the bolt 57 cooperating with the raised portion 60. In fact, after the control member 61 is released by the passenger, the bolt 57 is returned to the locking position. It therefore cannot cross the raised portion 60.

If the passenger wishes to bring the flap to its deployed position, he once again activates the control member 61, to retract the bolt 57 and allow it to cross the raised portion 60. Once the bolt 57 is retracted, the passenger pulls the drawer 15 to the deployed position. In fact, as of the intermediate position or shortly after the intermediate position, each cam member 45 is no longer in contact with the corresponding cam follower 47, such that the flap is no longer biased toward its deployed position by the elastic member(s) 51.

When the passenger no longer wishes to use the flap, he pushes it back from its deployed position to its storage position. Upon approaching the intermediate position, the end 65 of the bolt bears by its oblique side against the oblique face 69 of the raised portion 60. This causes the retraction of the bolt 57, such that the latter can cross the raised portion 60, and the drawer can continue its movement toward the storage position.

Furthermore, during the movement of the drawer 15, each cam follower 47 can bear against the corresponding cam member 45 and push the latter against the return force of the elastic member 51. This causes the cover 11 to move from its open position to its closed position.

This closed position is obtained when the flap 15 reaches the storage position.

Upon approaching the storage position, the bolt 57 crosses the raised portion 59, as described above relative to the raised portion 60.

Alternatively, as indicated above, the locking device does not include raised portions 60, provided to lock the flap in its intermediate position. Once the flap is released from its storage position, it is propelled by the elastic member(s) until the cover has reached its open position. It then suffices for the passenger to pull on the flap to bring it into the deployed position, the passenger not having to activate the control member a second time.

In one alternative embodiment, the intermediate position of the flap, corresponding to more than 80% of the travel of the cover, may be situated at more than 20% of the first travel.

In another alternative embodiment, the movement of the cover from its closed position toward its open position may be caused by the movement of the flap from its storage position not toward its deployed position, but in the opposite direction. In other words, the passenger would push the flap toward the bottom of the storage volume to move the cover. In that case, the locking device could include a heart cam.

According to another alternative embodiment, the arm 45 and the lug 47 could be replaced by a cam race arranged on one of the cover and the flap, and a cam follower following the cam race, arranged on the other of the cover [and] the flap.

Alternatively, the locking device could be arranged such that the bolt is supported by the structure 3, and the raised portions 59, 60 by the drawer 15.

Other locking devices can be considered.

The travel of the flap 11 from its closed position toward its open position is limited by a stop, which therefore defines the open position. Likewise, the travel of the flap 15 from its storage position toward its deployed position is limited by a stop. This stop defines the deployed position. Alternatively, the locking device 55 includes a third raised portion, not shown, cooperating with the bolt 57 to lock the flap in the deployed position, removably.

The invention claimed is:

1. An interior assembly of a vehicle, the assembly comprising:
    a structure delimiting a storage volume intended for the storage of various objects onboard the vehicle and an aperture by which the storage volume communicates with a passenger compartment of the vehicle;
    a cover;
    a connection between the cover and the structure, arranged so that the cover is movable relative to the structure between a closing position covering the aperture and an open position in which the aperture is uncovered;
    a flap; and
    a connection between the flap and the structure, arranged so that the flap is movable relative to the structure between a storage position, in which the flap extends at least partially inside the storage volume, and a deployed position, in which at least part of the flap is situated outside the storage volume;
    wherein the cover and flap are separate components that move relative to each other, and wherein the assembly further includes a connection between the cover and the flap such that a movement of the flap causes a movement of the cover from its closing position toward its open position.

2. The assembly according to claim 1, wherein the movement of the flap from its storage position toward its deployed position causes the movement of the cover from its closing position toward its open position.

3. The assembly according to claim 1, wherein the flap moves from its storage position to its deployed position over a first travel, the cover moving from its closing position toward its open position along a second travel, the movement of the flap toward its deployed position to an intermediate position situated at less than 20% of the first travel causing a movement of the cover from its closing position toward its open position over at least 80% of the second travel.

4. The assembly according to claim 1, wherein the connection between the flap and the structure is sliding.

5. The assembly according to claim 1, wherein the connection between the cover and the flap comprises at least one cam member connected to the cover, and at least one cam follower connected to the flap.

6. The assembly according to claim 1, wherein the connection between the cover and the flap also comprises at least one elastic member, interposed between the cover and the structure, and returning the cover to its open position.

7. The assembly according to claim 6, wherein the connection between the cover and the flap comprises at least one cam member connected to the cover, and at least one cam follower connected to the flap, and wherein the cam member and the cam follower are arranged so that:
    the cam member pushes on the cam follower under the effect of the return force of the elastic member, at least when the flap is in the storage position, in a direction propelling the flap toward its deployed position;
    the cam follower pushes the cam member against the return force of the elastic member, when the flap is moved to its storage position.

8. The assembly according to claim 1, wherein it comprises a locking device, reversibly locking the flap relative to the structure in the storage position.

9. The assembly according to claim 8, wherein the flap moves from its storage position to its deployed position over a first travel, the cover moving from its closing position toward its open position along a second travel, the movement of the flap toward its deployed position to an intermediate position situated at less than 20% of the first travel causing a movement of the cover from its closing position toward its open position over at least 80% of the second travel, and wherein the locking device is able to reversibly lock the flap relative to the structure in the intermediate position.

10. The assembly according to claim 8, wherein the locking device comprises a bolt connected to the flap and cooperating with at least one raised portion of the structure to lock the flap, a control member accessible to a passenger of the vehicle, and a kinematic chain arranged so that actuation of the control member by the passenger causes the disengagement of the bolt with respect to the raised portion and the release of the flap.

* * * * *